United States Patent [19]
Bismarck

[11] 3,872,432
[45] Mar. 18, 1975

[54] SYNCHRONIZATION CIRCUIT FOR A VITERBI DECODER

[75] Inventor: Otto Herbert Bismarck, Fords, N.J.

[73] Assignee: International Telephone and Telegraph Corporation, Nutley, N.J.

[22] Filed: Apr. 10, 1974

[21] Appl. No.: 459,522

[52] U.S. Cl. ................ 340/146.1 AQ, 340/146.1 D
[51] Int. Cl...... G06f 11/12, G08c 25/00, H041 1/10
[58] Field of Search ........... 340/146.1 AQ, 146.1 D, 340/146.1 AV, 172.5; 178/69.5 R

[56] References Cited

UNITED STATES PATENTS

| | | | |
|---|---|---|---|
| 3,227,999 | 1/1966 | Hagelbarger | 340/146.1 AQ |
| 3,665,396 | 5/1972 | Forney, Jr. | 340/146.1 AQ |
| 3,697,950 | 10/1972 | Low et al. | 340/146.1 AQ |
| 3,789,359 | 1/1974 | Clark, Jr. et al. | 340/146.1 D |
| 3,789,360 | 1/1974 | Clark, Jr. et al. | 340/146.1 AQ |
| 3,805,236 | 4/1974 | Battail | 340/146.1 AQ |

*Primary Examiner*—Charles E. Atkinson
*Attorney, Agent, or Firm*—John T. O'Halloran; Menotti J. Lombardi, Jr.; Alfred C. Hill

[57] ABSTRACT

A Viterbi decoder sync circuit is disclosed that provides an optimum synchronization, that is, synchronized as to phase, proper sequence of binary 1's and binary 0's in selected output coded data relative to the received data stream, and as to sync, proper location in time of the selected output coded data relative to the received data stream so that bits 1, 2 and 3 of the selected output coded data word are time coincident with bits 1, 2 and 3 of the received coded data word. The sync circuit disclosed herein accomplishes this by determining the spread between the maximum path metrics and next-to-maximum path metrics and averaging the determined spread over a predetermined number of decoding cycles.

10 Claims, 7 Drawing Figures

PATENTED MAR 18 1975 3,872,432

SHEET 2 OF 4

SYNCHRONIZATION CIRCUIT FOR A VITERBI DECODER

BACKGROUND OF THE INVENTION

This invention relates to a Viterbi decoder and more particularly for a synchronization circuit employed therewith.

A convolution coder and decoder using the Viterbi decoder algorithm can reduce error rates and increase the effective signal-to-noise ratio of a satellite transmission system. It does this by increasing channel bandwidth while reducing transmission power.

The Viterbi decoder has received much attention in the literature, see, for instance, the following articles for an explanation of technical terms and other background.

1. A. J. Viterbi, "Convolution Codes and Their Performance in Communication Systems," IEEE Transactions On Communications Technology, Vol. COM—19, No. 5, October 1971, Pages 751–772.
2. J. A. Heller and I. M. Jacobs, "Viterbi Decoding For Satellite and Space Communication," IEEE Transactions On Communications Technology, Vol. COM—19, No. 5, October 1971, Pages 835–848.
3. J. W. Layland, "Information Systems: Performance of Short Constraint Length Convolutional Codes and a Heuristic Code-Construction Algorithm" Jet Propulsion Laboratories Space Programs Summary 37–64, Vol. II, Aug. 31, 1970, Pages 41–44.
4. J. W. Layland, "Information Systems: Synchronizability of Convolutional Codes," Jet Propulsion Laboratories Space Programs Summary 37–64, Vol. II, Aug. 31, 1970, Pages 44–50.

The synchronization circuit for a Viterbi decoder to be synchronized as to phase, that is, to provide for the selected output coded data the same sequence of binary 1's and binary 0's as is present in the received data stream and also must cause the selected output coded data and received data stream to be synchronized, that is, to provide bits 1, 2 and 3 of the selected output coded data word to be in time coincidence with bits 1, 2 and 3 of the received coded data word. Whether a Viterbi decoder is in-sync or not and in-phase or not can be determined by the behavior of the path metrics of the convolutional code. Prior art Viterbi decoder synchronization circuits have emloyed the criterion of the spread between the maximum path metric and the average of all the other path metrics. When the decoder is both in-phase and in-sync, the maximum path metric "sticks out like a sore thumb" from among all the other path metrics. If there is a phase or sync error, the maximum path metric barely exceeds the average of the other path metrics. Because the average of all the other path metrics requires complicated circuitry to establish each output bit the implementation of the Viterbi decoder algorithm is uneconomical.

SUMMARY OF THE INVENTION

An object of the present invention is to provide a synchronization circuit for a Viterbi decoder that employs a simplified means of implementing the Viterbi algorithm so as to provide an economical synchronization circuit to enable the use of convolutional codes for improving communications efficiency.

Another object of the present invention is to provide a simpler synchronization circuit for a Viterbi decoder employing the criterion of the spread between the maximum path metric and the next-to-maximum path metric which will provide comparable accuracy with a heretofore criterion for synchronization during decoding.

A feature of the present invention is the provision of a synchronization circuit for a Viterbi decoder comprising: a source of path metrics for a Viterbi code, each of the path metrics being updated sequentially in response to input Viterbi code data; first means coupled to the source to determine a maximum path matric and a next-to-maximum path metric from the updated path metrics; second means coupled to the first means to determine the spread between the maximum and the next-to-maximum path metrics; and third means coupled to the second means responsive to the spread between the maximum and the next-to-maximum path metrics to select output code data from the source and to maintain the selected output code data in an inphase condition and in an in-sync condition with respect to the input code data.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

In the description that follows the Viterbi code that is being considered for purposes of explanation is a 3 bit Viterbi code which determines the value of the various timing signals required for the operation of the synchronization circuit in accordance with the principles of the present invention.

Figure 1:
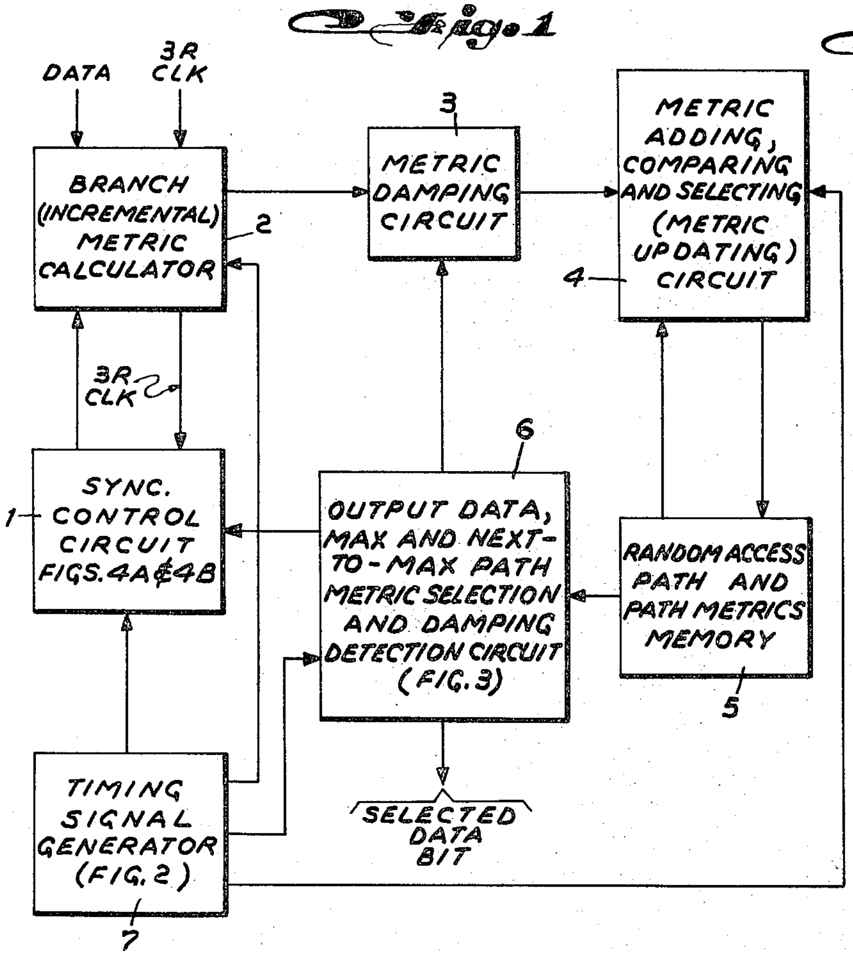
FIG. 1 is a simplified block diagram of a Viterbi decoder incorporating a synchronization circuit in accordance with the principles of the present invention.
Figure 5:
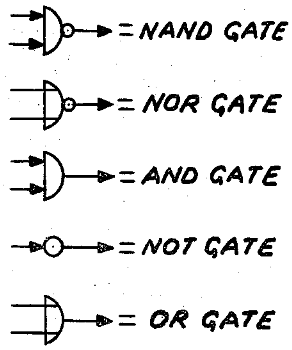
FIG. 5 is a diagram identifying the various logic symbols employed in FIGS. 2, 3, 4A and 4B.

Referring to FIG. 1 there is illustrated therein a schematic block diagram of a Viterbi decoder including a sync control circuit 1 in accordance with the principles of the present invention.

The transmitted convolutional code bits and a 3R clock derived from the received convolutional code bits are coupled to branch metric calculator 2. The transmitted data bits are received in groups of three and compared to $2^3 = 8$ possible branch paths. The degree of fit between received convolutional code bits and the eight possible branches in expressed as branch metrics. The 3R clock may be derived from the received data in any known manner, such as exciting a filter tuned to the frequency of 3R, where R is the bit rate of a conventional PCM (Pulse Code Modulation) signal. The output of calculator 2 is coupled to metric damping circuit 3 and then to a metric adding, comparing and selecting circuit 4 which receives previously stored path metrics from random access path and path metric memory 5, updates the previously stored path metrics and then returns the updated version of the previously stored path metrics to memory 5.

Random access memory 5 stores 16 paths (binary bit streams) for the 16 possible states, there being two possible branch metrics for each state of a path, together with the corresponding path metric which is the degree of fit between that path (binary bit stream) and the actually received signal path (binary bit stream). When three transmitted bits, corresponding to the conventional PCM information bit have been received, the two possible branches that lead to a new state are added to previous states sequentially removed from memory 5 in circuit 4 and their degree of fit is compared in circuit 4 with the better fit being selected for storage again in memory 5. When all 16 states of memory 5 have been updated in circuit 4 the oldest bit of the path with the best fit is selected as the output data bit by the output data, maximum and next-to-maximum path metric selection and damping detection circuit 6. To avoid overflow of the path metric in memory 5, which keep growing as they are updated, the size of the highest metric is determined in circuit 6 and a control signal indicating this determination is coupled to circuit 3 to reduce the value of all of the path metrics. Circuit 6 also detects the maximum path metric and next-to-maximum path metric which are coupled to sync control circuit 1 to control the operation thereof to assure proper synchronization between the data bit selected by circuit 6 and the incoming data to calculator 2.

Sync control circuit 1 operates to cause an inversion of the incoming data in calculator 2 to achieve the in-phase portion of the synchronization operation of circuit 1. Circuit 1 also provides an arrangement to inhibit pulses of the 3R clock so as to shift the incoming data so as to achieve the in-sync portion of the synchronization operation of circuit 1.

Figure 2:
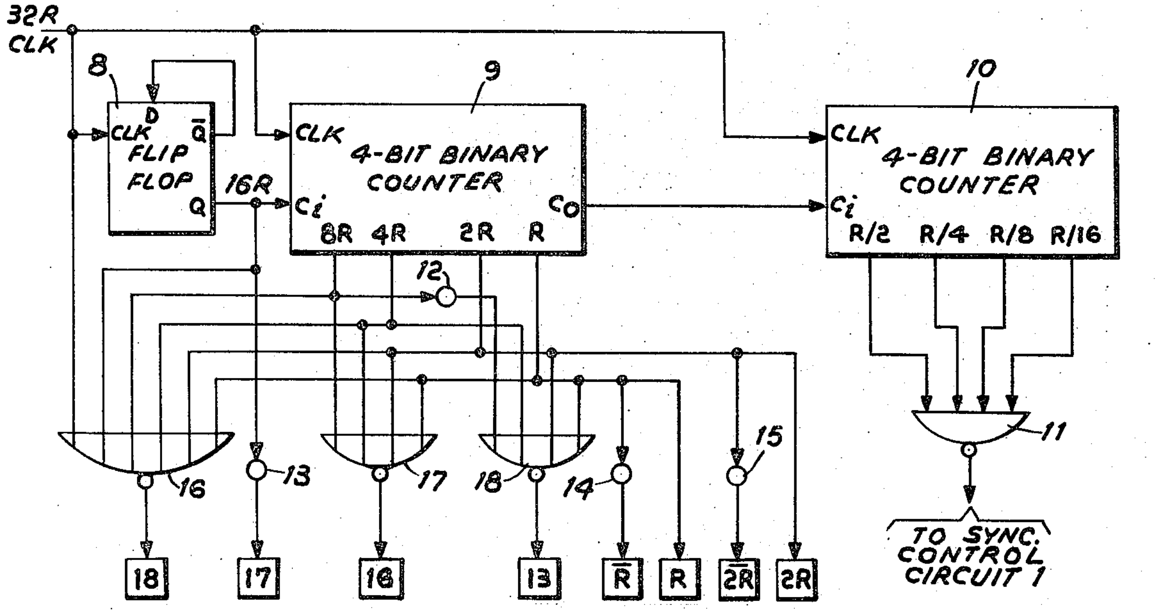
FIG. 2 is a logic diagram of one embodiment of the timing signal generator of FIG. 1.

Timing signal generator 7 produces various timing signals to control the operation of the other components in the Viterbi decoder of FIG. 1. FIG. 2 illustrates a schematic logic block diagram of one possible embodiment of timing signal generator 7. Generator 7 includes flip flop 8, 4-bit counter 9 and 4-bit binary counter 10. Flip flop 8 and counters 9 and 10 have applied to their clock (CLK) input a 32R clock from a stable oscillator, such as a crystal oscillator and pulse generator (not shown). NAND gate 11 is coupled to counter 10 as illustrated to provide a control signal for use in circuit 1 so that the spread between the maximum path metrics and the next-to-maximum path metrics may be averaged over 16 decoding cycles. NOT gates 12, 13, 14 and 15 together with NOR gates 16, 17 and 18 are coupled to counter 9, flip flop 8 and 32R clock input to produce various other timings signals that are employed in circuits 1 through 6.

Figure 3:
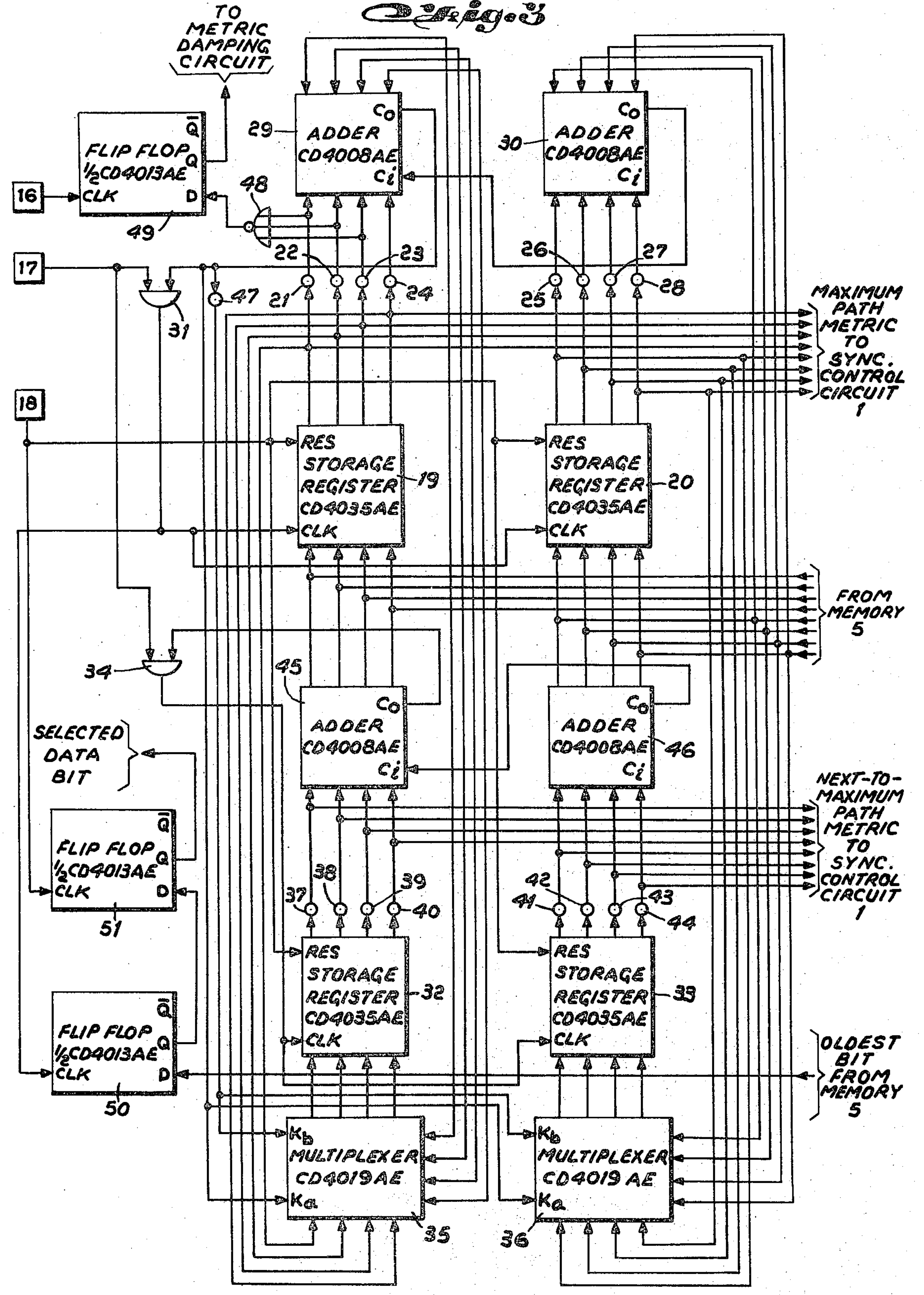
FIG. 3 is a logic diagram of the output data, maximum and next-to maximum path metrics selection and damping detection circuit of FIG. 1.

Referring to FIG. 3 there is illustrated therein the logic diagram to perform the functions of circuit 6 of FIG. 1; namely, to provide the selected data bit, to select the maximum path metric and next-to-maximum path metric and to detect when damping is needed so the damping detection as to place damping circuit 3 of FIG. 1 in operation to reduce all of the path metrics in memory 5. The path metrics from memory 5 are read sequentially therefrom and are compared to the path metric already stored in shift registers 19 and 20, which are zero at the start of every decoding cycle, by means of NOT gates 21–28 and adders 29 and 30. If the path metric from memory 5 is larger than the one stored in registers 19 and 20, the contents of registers 19 and 20 are replaced by path metrics from memory 5 under control of AND gate 31 and the contents previously stored in registers 19 and 20 are loaded into storage registers 32 and 33 through multiplexers 35 and 36 under control of the carry output $C_0$ of adder 29. If the path metric from memory 5 is smaller than the path metric stored in registers 19 and 20, the path metric from memory 5 is compared to the contents of storage registers 32 and 33 by means of NOT gates 37–44 and adders 45 and 46. If the contents of registers 32 and 33 are smaller than the path metric from memory 5, the contents of registers 32 and 33 are replaced by the path metric from memory 5 under control of AND gate 34. The path metric of memory 5 is coupled to registers 32 and 33 through multiplexers 35 and 36 under control of NOT gate 47. If the path metric from memory 5 is smaller than the contents of both registers 19 and 20 and registers 32 and 33, no replacement takes place.

The damping detection circuit includes NOR gate 48 coupled to the outputs of NOT gates 21, 22 and 23 which will produce a high output from gate 48 when the outputs of any of NOT gates 21, 22 and 23 are low which is indicative of an excessive value of the maximum path metric. The high output of gate 48 will cause flip flop 49 to produce a high output on its output Q for coupling to metric damping circuit 3 (FIG. 1) to trigger the necessary circuitry to reduce the value in circuit 4 of all of the path metrics stored in memory 5.

As mentioned hereinabove with respect to FIG. 1, the oldest bit from memory 5 with the best fit is coupled from memory 5 to flip flop 50 and, hence, to flip flop 51 which will provide the selected data bit on the Q output of flip flop 51.

Figure 4C:
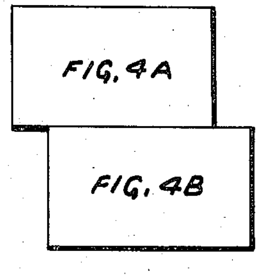
FIGS. 4A and 4B when organized as illustrated in FIG. 4C is a logic diagram of the sync control circuit of FIG. 1 in accordance with the principles of the present invention.
Figure 4A:
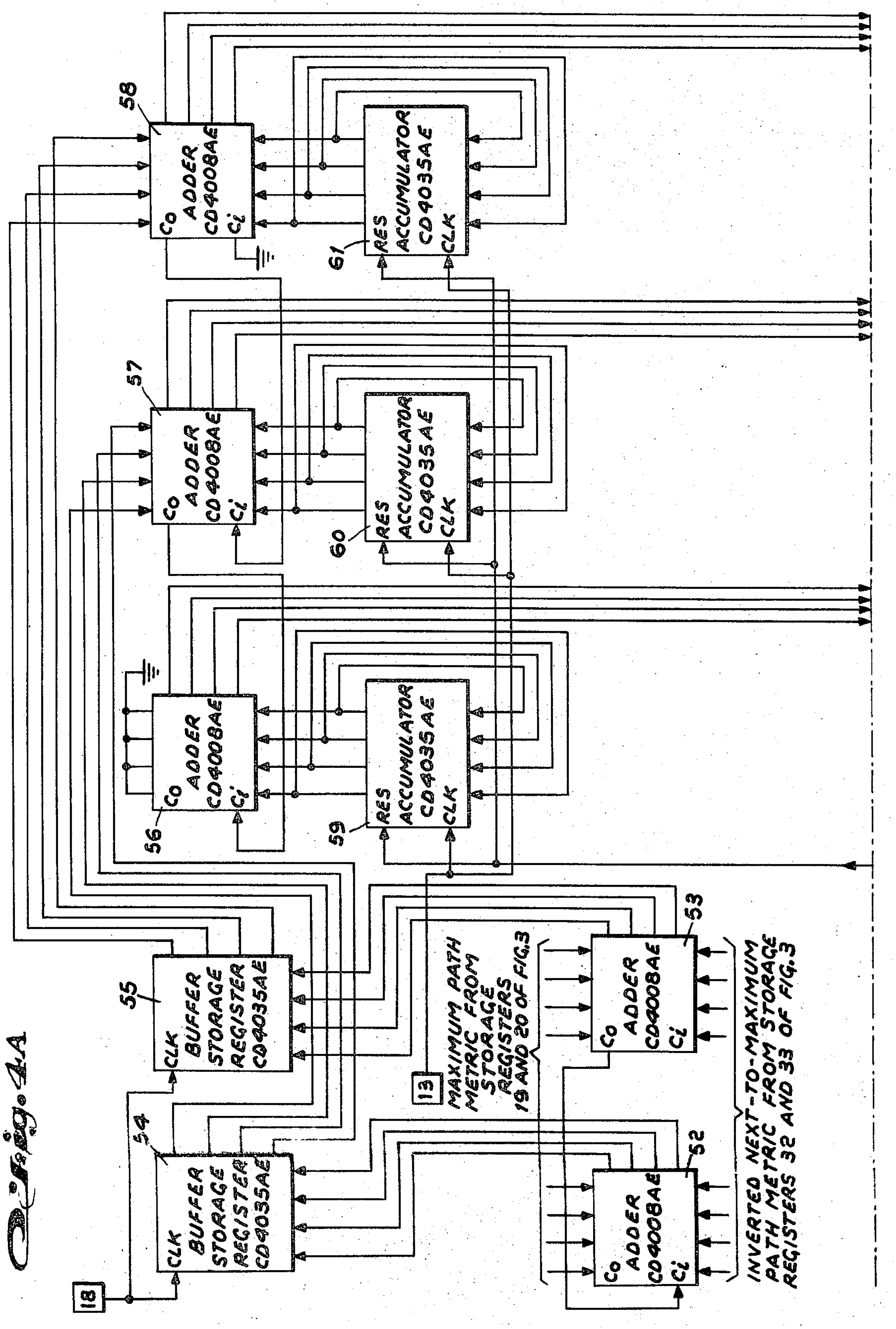
Figure 4B:
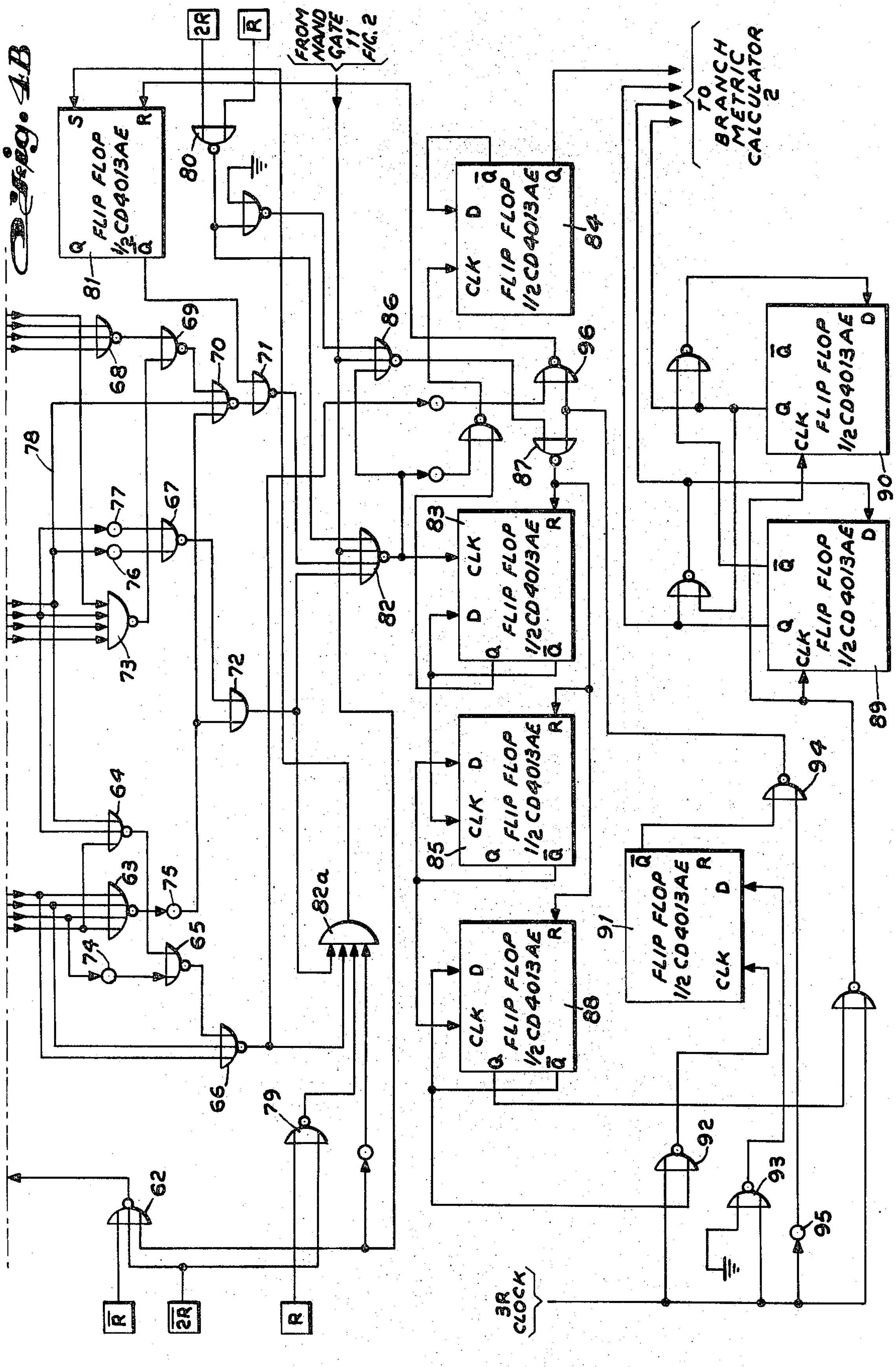

Referring to FIGS. 4A and 4B, when organized as illustrated in FIG. 4C, there is illustrated the sync control circuit 1 (FIG. 1) in accordance with the principles of the present invention. At the end of every decoding cycle the next-to-maximum path metric from storage registers 32 and 33 of FIG. 3, inverted by NOT gates 37–44, is added to the contents of storage registers 19 and 20 in adders 52 and 53. The resultant difference or spread between the maximum path metric and the next-to-maximum path metric is stored in buffer storage registers 54 and 55. The contents of storage registers 54 and 55 are added up in an accumulator for 16 decoding cycles in order to determine the average spread between the maximum path metrics and the next-to-maximum path metrics. The accumulator includes adders 56, 57 and 58 and accumulators 59, 60 and 61 with the operation of the accumulator being reset when NOR gate 62, which has one input coupled to NAND gate 11 of FIG. 2, goes high at three-fourth of the sixteenth decoding cycle. NOR gates 63, 64, 65, 66, 67, 68, 69, 70 and 71, OR gate 72, NAND gate 73 and NOT gates 74, 75, 76 and 77 serve to establish one of the following four ranges of numerical content of accumulators 59–61. The four ranges are 576 or over, 575 to 192, 191 to 121 and 120 and under. The output of NOT gate 74 is low when the accumulator count is equal to or over 512, the output of NOT gate 75 is low when the accumulator count is under 256, the output of NOR gate 64 is low when the accumulator count is between 64 to 511, the output of NOR gate 65 is high for an accumulator count of 576 and over and the output of NOR gate 66 is high under a count of 576. The conductor 78 is low when the accumulator count is under 128, the output of NAND gate 73 is low when the accumulator count is between 120–127, the output of OR gate 72 is low when the accumulator count is under 192, the output of NOR gate 70 is high when the accumulator count is 120 and under, the output of NOR gate 69 is high when the accumulator count is between 121 to 127, and the output of NOR gate 68 is low when the accumulator count is between 1 and 7. The output of NOR gate 79 goes high at one-fourth of the sixteenth decoding cycle and the output of NOR gate 80 goes low at one-half of the sixteenth decoding cycle. Flip flop 81 is a threshold flip flop which is set to a high threshold (under 192) if the count after 16 cycles is 576 or over by the output of AND gate 82. The high threshold for such a high count means a low noise figure which increases the out-of-sync spread. Threshold flip flop 81 is also set to a high threshold if a change in sync has occurred which speeds up the sync and phase search process. The threshold of flip flop 81 is set to a low value (120 or under) if the accumulator count after sixteen decoding cycles is between 192 (inclusive) and 576 (not inclusive), that is, when the Viterbi decoder can be assumed to be both in-phase and in-sync and the noise level is average.

If the count in accumulators 59–61 at the beginning of the sixteenth cycle is below the low threshold, the output of NOR gate 82 goes high producing a clock pulse for flip flop 83 which changes state. If flip flop 81 changes state as second time because of another count below the low threshold, flip flops 84 and 85 also change state. Flip flop 84 inverts the phase of the incoming bits by coupling the high output of flip flop 84 in its changed state to branch metric calculator 2. If such a phase flip produces a count above the low threshold, the three inputs of NOR gate 86 stay low producing a reset pulse through NOR gate 87 for flip flops 83, 85 and 88. If the count now stays above the low threshold, a correct phase and sync condition is established. On the other hand, if the change in phase has produced no count above low threshold, the next two low counts change the phase a second time back to the original state and also changes the state of flip flop 88 which stays in the high state until one clock pulse of the incoming 3R clock has been skipped, effecting a sync correction in flip flops 89 and 90. The effect of a sync correction by flip flops 89 and 90 is coupled to branch metric calculator 2 (FIG. 1) to cause a shift in the time of the three received convolutional code bits. At the time of the sync correction by changing the states of flip flops 89 and 90, flip flops 83, 85 and 88 are reset at this same time and also flip flop 81 is reset to a high threshold by NOR gate 96. As long as the count after sixteen decoding cycles stays below the low threshold, the search continues in the same fashion, first a change in phase which is changed back and replaced by a change in sync until the desired synchronized condition is achieved. Flip flop 91 and its associated NOR gates 92, 93 and 94 and NOT gate 95 serve the purpose of synchronizing the sync correction with the 3R clock.

It will be noted that in various blocks in FIGS. 3, 4A, and 4B, a number is present therein with a prefix CD. These numbers are the model numbers of integrated circuitry fully disclosed in the "RCA Solid State Data-Book Series SSD–203 A" 1973 edition. By referring to the indicated numbers in the above cited data book all of the logic components are fully disclosed and should enable the proper implementation of the sync control circuit of the present invention.

While I have described above the principles of my invention in connection with specific apparatus it is to be clearly understood that this description is made only by way of example and not as a limitation to the scope of my invention as set forth in the objects thereof and in the accompanying claims.

I claim:

1. A synchronization circuit for a Viterbi decoder comprising:

a source of path metrics for a Viterbi code, each of said path metrics being updated sequentially in response to input Viterbi code data;

first means coupled to said source to determine a maximum path metric and a next-to-maximum path metric from said updated path metrics;

second means coupled to said first means to determine the spread between said maximum and said next-to-maximum path metrics; and third means coupled to said second means responsive to said spread between said maximum and said next-to-maximum path metrics to select output code data from said source and to maintain said selected output code data in an in-phase condition and in an insync condition with respect to said input code data.

2. A circuit according to claim 1, wherein said first means includes fourth means coupled to said source to store previous ones of said updated path metrics;

fifth means coupled to said source and said fourth means to compare said previous ones of said updated path metrics with respect to present ones of said updated path metrics, and sixth means coupled to said source, said fourth means and said fifth means to store said previous ones of said updated path metrics if said present ones of said updated path metrics are greater than said previous ones of said updated path metrics with said present ones of said updated path metrics being stored in said fourth means and to store said present ones of said updated path metrics if said previous ones of said updated path metrics are greater than said present ones of said updated path metrics, said fourth means providing said maximum path metrics and said sixth means providing said next-to-maximum path metrics.

3. A circuit according to claim 2, wherein said fourth means includes a first storage register coupled to said source;

said fifth means includes first inverters coupled to the outputs of said first storage register, and a first adder coupled to said first inverters and said source; and said sixth means includes a multiplexer coupled to said first storage register and said source, a second storage register coupled to said multiplexer, second inverters coupled to the outputs of said second storage register, a second adder coupled to said second inverters and said source, and logic gates coupled between said first adder and said multiplexer to respond to the results of the comparison in said first adder to control the storage of one of said previous ones and said present ones of said updated path metric in said second storage register.

4. A circuit according to claim 3, further including seventh means coupled to the output of certain ones of said first inverters to produce a damping control signal when said maximum path metric become excessive, said damping control signal being coupled to said source to reduce all of said updated path metrics a predetermined amount.

5. A circuit according to claim 1, wherein said second means includes
fourth means coupled to said first means to add said maximum path metrics to the inverse of said next-to-maximum path metrics to provide a resultant difference,
fifth means coupled to said fourth means to store said resultant difference, and
sixth means coupled to said fifth means to obtain an average of said resultant difference over a predetermined number of decoding cycles.

6. A circuit according to claim 5, wherein said fourth means includes
a first adder coupled to said first means; said fifth means includes
a buffer storage coupled to said first adder; and said sixth means includes
a second adder having one set of inputs coupled to ground,
a third adder having one set of inputs coupled to one half of the outputs of said buffer storage,
a fourth adder having one set of inputs coupled to the other half of the outputs of said buffer storage,
a first accumulator coupled between the outputs of said second adder and the other set of inputs thereof,
a second accumulator coupled between the outputs of said third adder and the other set of inputs thereof, and
a third accumulator coupled between the outputs of said fourth adder and the other set of inputs thereof.

7. A circuit according to claim 1, wherein said third means includes
a first set of logic gates coupled to said second means to establish four ranges of numerical count,
a first bistable device coupled to said first set of logic gates providing a first binary condition when said numerical count is in excess of said four ranges and a second binary condition when said numerical count is in a given one of said four ranges,
a second bistable device,
a plurality of interconnected bistable devices,
a source of clock signal having a rate equal to the bit rate of said input code data, and
a second set of logic gates coupled to said first bistable device, said second bistable device, said plurality of interconnected bistable devices and said source of clock signal to control said second bistable device to control the polarity of said input code data and to control said plurality of interconnected bistable devices to control flow of said clock signal to said source of path metrics to enable proper selection of said output code data and to maintain said selected output code data in an in-phase condition and in an in-sync condition with respect to said input code data.

8. A circuit according to claim 1, wherein said first means includes
fourth means coupled to said source to store previous ones of said updated path metrics;
fifth means coupled to said source and said fourth means to compare said previous ones of said updated path metrics with respect to present ones of said updated path metrics, and
sixth means coupled to said source, said fourth means and said fifth means to store said previous ones of said updated path metrics if said present ones of said updated path metrics are greater than said previous ones of said updated path metrics with said present ones of said updated path metrics being stored in said fourth means and to store said present ones of said updated path metrics if said previous ones of said updated path metrics are greater than said present ones of said updated path metrics,
said fourth means providing said maximum path metrics and said sixth means providing said next-to-maximum path metrics;
said second means includes
seventh means coupled to said fourth means and said sixth means to add said maximum path metrics to the inverse of said next-to-maximum path metrics to provide a resultant difference,
eighth means coupled to said seventh means to store said resultant difference, and
ninth means coupled to said eighth means to obtain an average of said resultant difference over a predetermined number of decoding cycles; and
said third means includes
a first set of logic gates coupled to said ninth means to establish four ranges of numerical count,
a first bistable device coupled to said first set of logic gates providing a first binary condition when said numerical count is in excess of said four ranges and a second binary condition when said numerical count is in a given one of said four ranges,
a second bistable device,
a plurality of interconnected bistable devices,
a source of clock signal having a rate equal to the bit rate of said input code data, and
a second set of logic gates coupled to said first bistable device, said second bistable device, said plurality of interconnected bistable devices and said source of clock signal to control said second bistable device to control the polarity of said input code data and to control said plurality of interconnected bistable devices to control flow of said clock signal to said source of path metrics to enable proper selection of said output code data and to maintain said selected output code data in an in-phase condition and in an in-sync condition with respect to said input code data.

9. A circuit according to claim 1, wherein said first means includes a first storage register coupled to said source of path metrics to store previous ones of said updated path metrics, first inverters coupled to the output of said first storage register, a first adder coupled to said first inverters and said source of path metrics, said first inverters and said first adder comparing said previous ones of said updated path metrics with respect to present ones of said updated path metrics a multiplexer coupled to said first storage register and said source of path metrics, a second storage register coupled to said multiplexer, second inverters coupled to the outputs of said second storage register, a second adder coupled to said second inverters and said source of path metrics, and logic gates coupled between said first adder and said multiplexer to respond to the results of the comparison in said first adder to control the storage of one of said previous ones of said updated path metrics and said present ones of said updated path metric in said second storage register; said previous ones of said updated path metrics being stored if said present ones of said updated path metrics are greater than said previous ones of said updated path metrics with said present ones of said updated path metrics being stored in said first storage register and said present ones of said updated path metrics being stored if said previous ones of said updated path metrics are greater than said present ones of said updated path metrics, said first storage register providing said maximum path metrics and said second storage register providing said next-to-maximum path metrics;

said second means includes a first adder coupled to said first and second shift registers to add said maximum path metrics to the inverse of said next-to-maximum path metrics to provide a resultant difference, a buffer storage coupled to said first adder to store said resultant difference, a second adder having one set of inputs coupled to ground, a third adder having one set of inputs coupled to one half of the outputs of said buffer storage, a fourth adder having one set of inputs coupled to the otherhalf of the outputs of said buffer storage, a first accumulator coupled between the outputs of said second adder and the other set of inputs thereof, a second accumulator coupled between the outputs of said third adder and the other set of inputs thereof, and a third accumulator coupled between the outputs of said fourth adder and the other set of inputs thereof, said second, third and fourth adders and said first, second and third accumulators cooperating to obtain an average of said resultant difference over a predetermined number of decoding cycles; and said third means includes a first set of logic gates coupled to said first, second and third accumulators to establish four ranges of numerical count, a first bistable device coupled to said first set of logic gates providing a first binary condition when said numerical count is in excess of said four ranges and a second binary condition when said numerical count is in a given one of said four ranges, a second bistable device, a plurality of interconnected bistable devices, a source of clock signal having a rate equal to the bit rate of said input code data, and a second set of logic gates coupled to said first bistable device, said second bistable device, said plurality of interconnected bistable devices and said source of clock signal to control said second bistable device to control the polarity of said input code data and to control said plurality of interconnected bistable devices to control flow of said clock signal to said source of path metrics to enable proper selection of said output code data and to maintain said selected output code data in an in-phase condition and in an in-sync condition with respect to said input code data.

10. A circuit according to claim 9, further including fourth means coupled to the output of certain ones of said first inverters to produce a damping control signal when said maximum path metrics become excessive, said damping control signal being coupled to said source to reduce all of said updated path metrics a predetermined amount.

* * * * *